(12) United States Patent
Masek et al.

(10) Patent No.: US 9,784,236 B2
(45) Date of Patent: Oct. 10, 2017

(54) FLEXIBLE WATER TURBINE

(71) Applicants:Vlastimil Masek, St. John's (CA); Andrew Cook, St. John's (CA)

(72) Inventors: Vlastimil Masek, St. John's (CA); Andrew Cook, St. John's (CA)

(73) Assignee: Memorial University of Newfoundland, St. John's (CA)

( * ) Notice: Subject to any disclaimer, the term of this patent is extended or adjusted under 35 U.S.C. 154(b) by 315 days.

(21) Appl. No.: 14/384,260

(22) PCT Filed: Mar. 11, 2013

(86) PCT No.: PCT/CA2013/050177
§ 371 (c)(1),
(2) Date: Sep. 10, 2014

(87) PCT Pub. No.: WO2013/131196
PCT Pub. Date: Sep. 12, 2013

(65) Prior Publication Data
US 2015/0042096 A1 Feb. 12, 2015

Related U.S. Application Data

(60) Provisional application No. 61/608,895, filed on Mar. 9, 2012.

(51) Int. Cl.
*F03B 13/10* (2006.01)
*F03B 13/26* (2006.01)
(Continued)

(52) U.S. Cl.
CPC ............... *F03B 13/10* (2013.01); *F03B 3/04* (2013.01); *F03B 13/26* (2013.01); *F03B 13/264* (2013.01);
(Continued)

(58) Field of Classification Search
CPC ......... Y02E 10/38; Y02E 10/28; Y02E 10/20; F03B 13/20; F03B 17/02; E02B 9/08
(Continued)

(56) References Cited

U.S. PATENT DOCUMENTS 4,102,291 A * 7/1978 Sebald ...................... B63J 3/00
114/244
6,531,788 B2 * 3/2003 Robson ................. F03B 17/061
290/42

(Continued)

FOREIGN PATENT DOCUMENTS

GB        2348249 A  *  9/2000  ............... F03B 3/04
GB        2441821 A  *  3/2008  ............ F03B 13/183

*Primary Examiner* — Tulsidas C Patel
*Assistant Examiner* — Charles Reid, Jr.
(74) *Attorney, Agent, or Firm* — Bereskin & Parr LLP

(57) ABSTRACT

A water mill, power generator, for use underwater, has a flexible support shaft which permits the water current to orient the turbine axis substantially parallel to the direction of flow so that the force of the water on the blades is optimized for a given turbine, without the need for slip ring style connections between the generator at the turbine and the 5 anchored base. Optionally, the design features fins or cowlings on the flexible support shaft to further improve reorientation of the turbine with the water current or flow acting as the source of power; and/or output power links or power conditioning systems at the anchored base. The generators may be selected to meet low rotation operating conditions, and the entire system may be designed for particular ocean bottom and/or current parameters applicable to the 10 deployment.

11 Claims, 4 Drawing Sheets

(51) Int. Cl.
  *F03B 13/06*   (2006.01)
  *F03B 3/04*    (2006.01)
  *H02K 7/18*    (2006.01)
  *F03B 17/06*   (2006.01)

(52) U.S. Cl.
  CPC ......... *F03B 17/061* (2013.01); *H02K 7/1823* (2013.01); *F05B 2240/62* (2013.01); *F05B 2240/97* (2013.01); *Y02E 10/28* (2013.01)

(58) Field of Classification Search
  USPC .................. 290/53–54, 42–43; 60/495–503; 417/330–333; 405/76
  See application file for complete search history.

(56) References Cited

U.S. PATENT DOCUMENTS

| | | | |
|---|---|---|---|
| 7,291,936 B1* | 11/2007 | Robson | F03B 13/264 290/43 |
| 7,541,688 B2* | 6/2009 | Mackie | F03B 13/26 290/54 |
| 2009/0140524 A1* | 6/2009 | Kejha | F03B 13/264 290/54 |
| 2010/0148512 A1* | 6/2010 | Pitre | F03B 13/10 290/54 |
| 2010/0221112 A1* | 9/2010 | Bevirt | F03D 5/00 416/135 |
| 2010/0295302 A1* | 11/2010 | Martin | F03B 17/06 290/43 |
| 2012/0212350 A1* | 8/2012 | Magnell | F03B 13/10 340/850 |

\* cited by examiner (a)  (b)  (c)

(a)

(b)

FLEXIBLE WATER TURBINE

FIELD

The present disclosure relates to water turbines and underwater power generation.

BACKGROUND

Hydro power is an abundant source of sustainable electricity. However, much of the world hydro energy exists in low flow rate currents in the ocean which are not captured or cannot be captured due to problems with existing technologies.

Where ocean flow is captured for conversion into energy, some existing horizontal axis technologies utilize slip ring units to account for flow direction variations, and to allow the generator/turbine to orient itself with the current flow while still allowing the power to be transmitted to a stationary base. This method has the disadvantage of wearing parts which, based on the location of the units on seabed, are difficult to access and replace. In tidal flow areas where the flow is primarily in two directions, turbines are designed to convert power from a stationary position in each direction; again requiring a more complicated system with a higher likelihood of parts failing at a high cost to access and repair.

There is a need for an underwater, power generation, turbine unit design that is more reliably oriented.

There is a need for an underwater, power generation, turbine unit design that is capable of generating power with a common turbine system regardless of changes in flow direction.

There is a need for an underwater, power generation, turbine unit design that can be readily deployed in areas were the seabed is not level or is of mixed composition, or where the water current direction varies over time and the flow speeds are low (<0.5 m/s).

SUMMARY

The present disclosure is for a self-orienting, predominantly horizontal axis turbine and generator system supported by a flexible shaft that is attached to some form of stable support base, for use in water. The flexible support shaft could be composed of a composite material (carbon fibre, fibreglass, etc.), and may be hollow. In operation, the flexible support shaft is capable of flexing to position the turbine/generator in the direction of flow (principally in the horizontal plane) via drag and partial buoyancy of the turbine in a water flow. Due to variability in the topography of the subsurface of a body of water (ocean floor, river bed, etc.), the angle between vertical relative to the support base and the flow direction will seldom be precisely 90°. The generator system at the head of the support shaft is connected to a power load (grid, subsea equipment, batteries, etc.) by electrical power cables from the generator at the turbine head. Where the flexible support shaft is hollow, electrical power cabling may be fed through the hollow shaft to the support base for interconnection with a grid interconnection, power link or another power load (subsea processing equipment, for instance) located at or proximate to the support base. A power conditioning and management system for interconnection with a grid or power link may occur at the turbine head, the support base, or at some other terminus of the power cabling. The drag force created by the current flow forces the turbine to orient itself parallel (in line with) the direction of the current, by flexing the flexible support shaft. The self orientation can be encouraged by fins, tails, baffling or other features connected near the head of the support shaft, so as to provide additional directionality and to assist with keeping the turbine/generator parallel to the flow direction.

The water current turns blades of the turbine for power generation. The unit can be scalable depending on power output required. The blades of the turbine may have profiles matched to the expected flow rates in the deployment area, and may themselves be rotatable should the turbines be deployed in areas where current strength is variable. The generator unit could be of any traditional type uses turbines suitable for a low speed environment (windmills, water mills, other low rpm applications).

Optionally, the generator nose-cone may be hydrodynamically designed to improve flow around the generator and increase the power output of the turbine.

One possible advantage of the design of a power generation element disclosed herein, is the elimination of the requirement for an electrical slip-ring unit, so that power generation unit can operate more reliably in an underwater environment. Use of a flexible stem, instead of a slip ring system, eliminates a number of rotating elements that wear, limit operating life and increase system cost. By having cabling within the hollow flexible stem/support shaft, power can be transmitted to a stationary base without slip rings.

Another possible advantage of the design of a power generation element disclosed herein, is that a flexible shaft may bend in 2 degrees of freedom, whereas each electrical slip-ring unit turns on one axis The system is designed to flexibly orient itself in response to small changes in current direction relative to the base, due to movement of the current or even reversals of flow, or due to instability or settling of the support base, in order to maximize force incident on the blades of the turbine from the water.

As compared to systems used in tidal flow areas, where the flow is primarily in two directions and turbines are designed to convert power from a stationary position in each direction; the turbine design disclosed herein has a simpler and more efficient design as, relative to its orientation, it only needs to convert power in only a single direction.

The power generation unit has advantages over omnidirectional vertical axis technologies in terms of rotational speed, power conversion efficiency, size, and scalability.

The power generation unit is designed for easy deployment in areas were the seabed is not level or of mixed composition. This flexible water turbine may also be useful in areas where the water current direction varies over time and the flow speeds are low (<0.5 m/s).

In general terms, the present disclosure relates to an underwater turbine and generator unit connected to an anchor point on the seabed by a flexible, hollow, support shaft, which permits the turbine to naturally align itself with maximum resistance to flow, which thereby improves performance over existing systems in variable direction, low flow underwater environments. Optionally, fins on the flexible support shaft improve reorientation of the turbine. Optionally, power management and control systems in a support base at the anchor point convert the power generated by the generator into a form standardized for the link or grid to which the power generation unit is connected.

The power generation unit has commercial potential and may be used for in situ power generation for underwater installations in the ocean observation, defense & security, and oil and gas markets.

As known in the art, the generators may be selected to meet low rotation operating conditions, and the entire system may be designed for particular ocean bottom and/or current parameters applicable to the deployment, where currents are greater than approximately 0.5 m/s.

Ocean observation systems require significant amounts of power as their sensing elements become more complex and the systems themselves are designed to perform more complex actions. This power system could be attached to increase deployment durations and could benefit both fixed and movable platforms (e.g. AUV or glider docking station). As well, this system could be applied in a similar way to defense/security systems to increase deployment times and system complexity/capabilities. Finally, the development of stand-alone 'sub-sea' systems for production from subsea wells is at the forefront as the industry looks toward reserves in deepwater and arctic environments. Such systems placed on or under the seabed reduce costly space requirements on platforms and are protected from harsh environmental conditions at the surface. Sub-sea systems rely on a high degree of automation or remote control from surface installations, require a significant amount of power, and must be highly reliable with little to no maintenance requirements.

One or more preferred embodiments of the power generation unit will now be described in a non limiting fashion, and in greater detail with reference to the accompanying drawings.

BRIEF DESCRIPTION OF THE DRAWINGS

Certain embodiments will be described in relation to the drawings in which:

FIG. 1(a) shows a side view power of the generation unit perpendicular to the direction of flow. FIG. 1 (b) shows a front view of the power generation unit into the direction of flow. FIG. 1(c) shows a perspective view the power generation unit, with arrows showing direction of the turbine and water.

DETAILED DESCRIPTION

Figure 1:
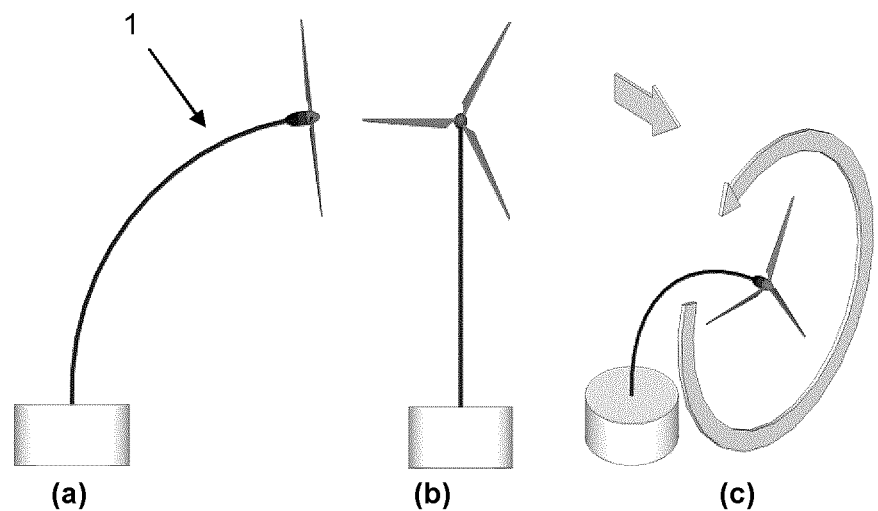
FIG. 1 shows three views of a power generation unit according to this disclosure.

As shown in FIG. 1, the power generation unit 1 has an anchored base connected to a turbine by a flexible support shaft, such that under the force of a current, the flexible support shaft will bend in the flow direction of the current, turning the blades of the turbine. Optionally within the flexible shaft, power cabling connects a generator at the turbine head with electronics and/or output cabling in the anchored base. Depending on the orientation of the blades, the turbine may rotate in either direction in the plane substantially perpendicular to the flow.

Figure 2:
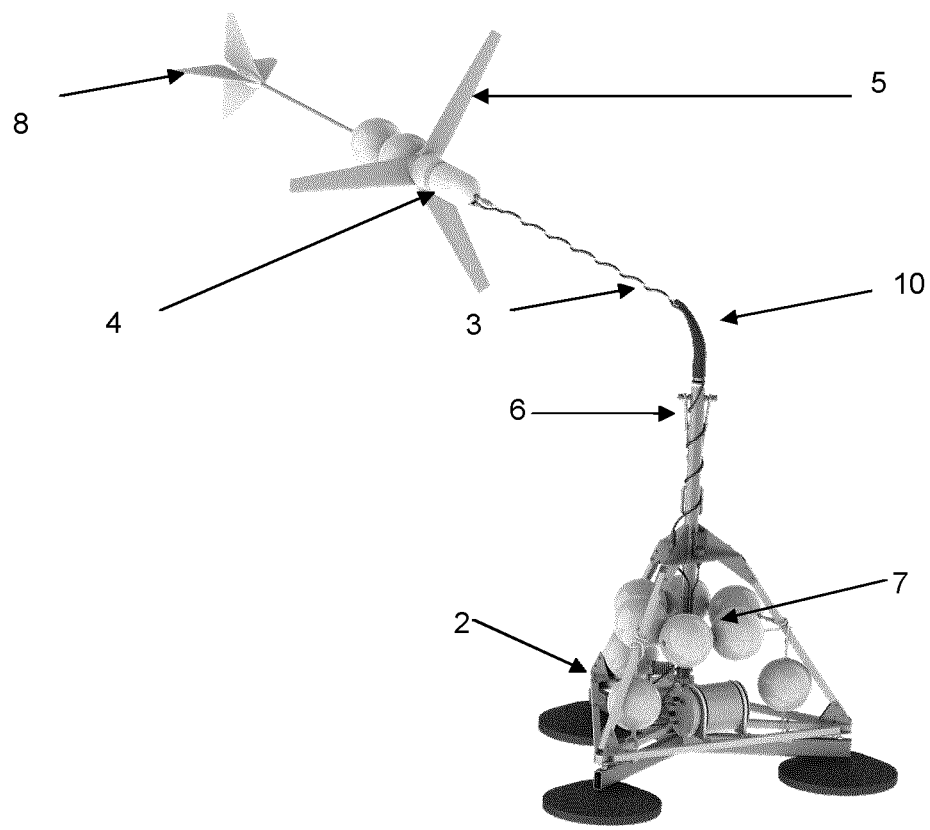
FIG. 2 is a perspective view another example of the power generation unit having stability/orientation fins downstream from the turbine.

As shown in FIG. 2, another example of power generation unit 10 comprises a base 2 having cabling 6 and electronics 7 connected to a generator 4 and turbine 5 by a flexible shaft 3. In this example of power generation unit 10, the flexible shaft 3 is not hollow, but the cabling 6 is wrapped around it. To further stabilize the shaft in the direction of the current driving the turbine 5, stabilizing fins 8 are mounted at the end of the flexible shaft 3 or turbine 5.

Figure 3:
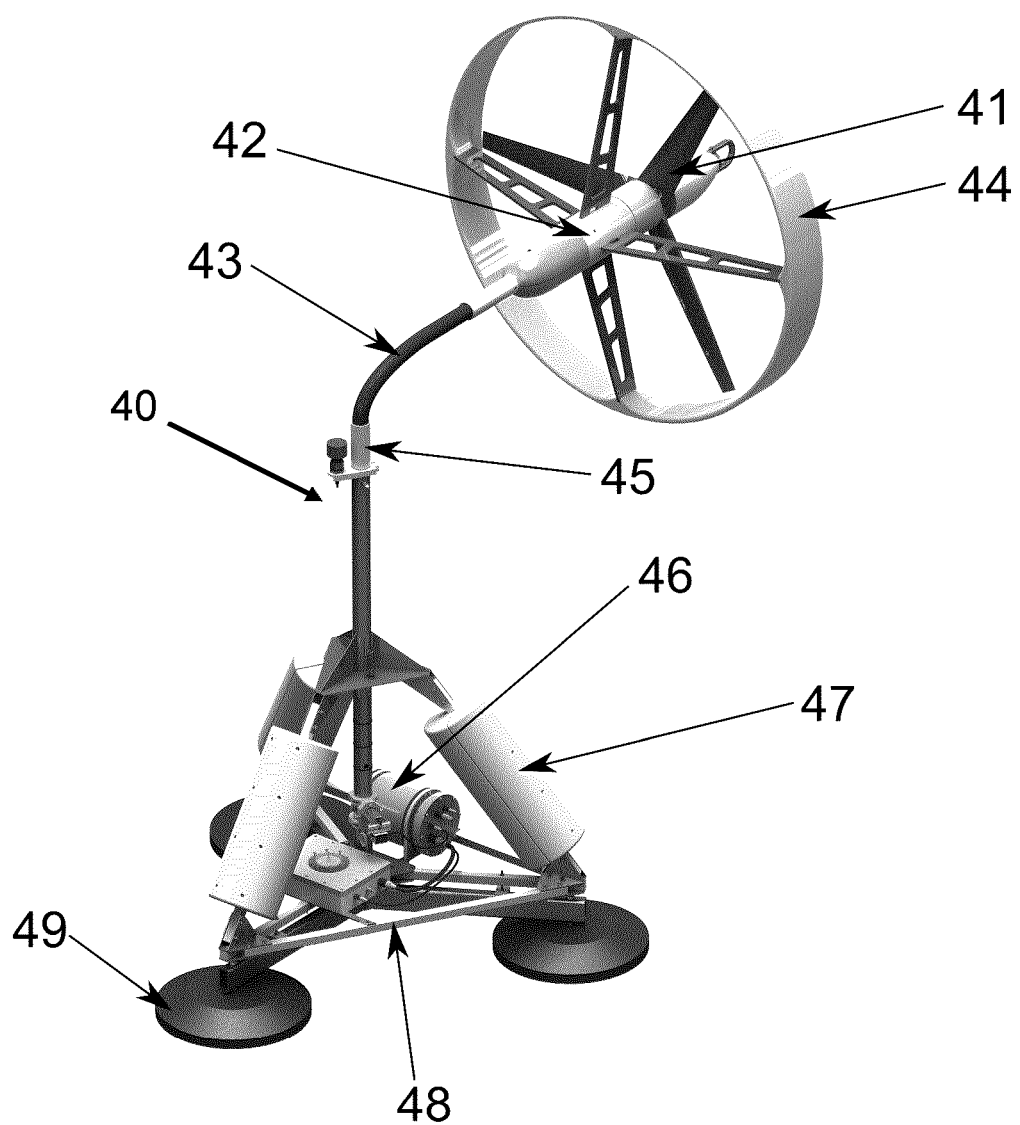
FIG. 3 is a perspective view another example of the power generation unit having a cowling about the turbine.

As shown in FIG. 3, another example of power generation unit 40 comprises: a base 48 having anchors 49 and floatation chambers 47, and housing electronics 46; connected to a flexible tether 43 by a tether to base coupling 45; which is connected to the generator 42 and multi-bladed turbine 41. This example has the addition of a cowling 44 about the turbine 41 to assist in orienting the axis of the turbine into the direction of flow.

Figure 4:
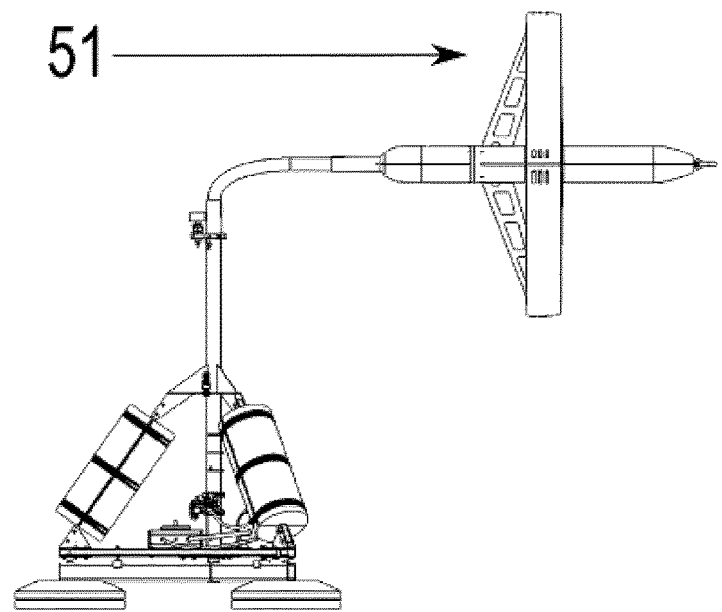
FIG. 4(a) and FIG. 4(b) show the water flow direction and the turbine direction of rotation for the power generation unit of FIG. 3.
Figure 4:
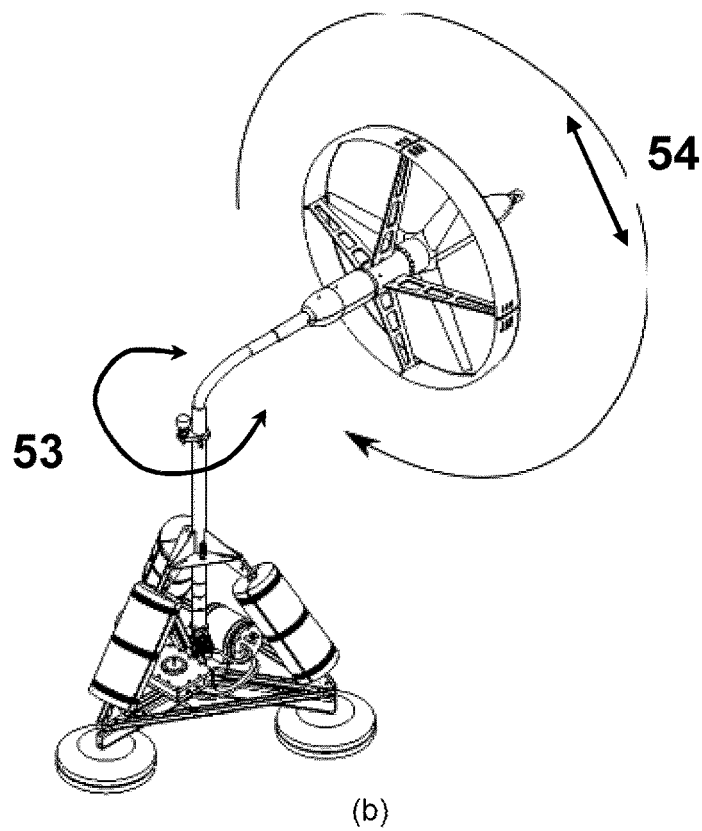

As shown in FIG. 4 (a) and FIG. 4 (b), with water flow direction 51, the flexible tether (shaft) 43 is capable of moving in two degrees of freedom about the base: a first degree of freedom 53 in the horizontal plane and in a second degree of freedom 54 perpendicular to the horizontal plane As water currents are substantially horizontal, the direction of the axis of the turbine during operation should be substantially horizontal. The anchor points may not be perfectly horizontal on the seabed, or may settle during use, and the turbine is able to compensate by using the water current to self orient the flexible tether/shaft. Other forces, such as buoyancy of the turbine and resilience of the shaft, also affect how it is positioned in water.

Figure 5:
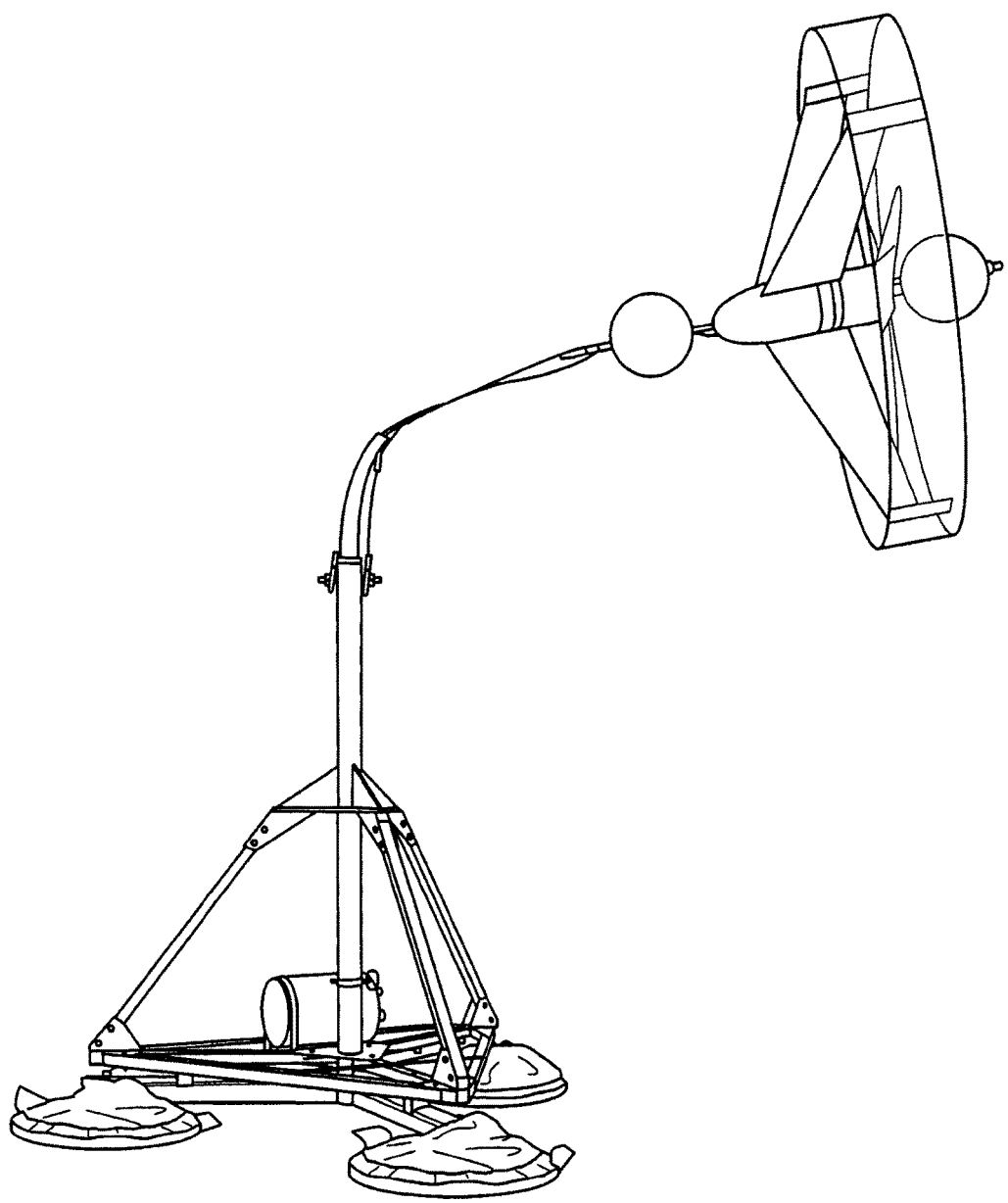
FIG. 5 is a photograph of a prototype of the the power generation unit of FIG. 3 in a test tank.

In testing, the horizontal axis turbine constructed with integrated gearing may improve rotational speed and overall efficiency. In the design tested in FIG. 5, the turbine blades had a tested efficiency of ~42%. A photo of the power generation unit of FIG. 5, uses the magnetic coupling and generator housing shown in FIG. 3. The turbine used in testing was 3 bladed and had an overall diameter of 1.6 m. The blades themselves were all identical and had a NACA 0025 profile with a 0.1524 m chord length at the root. This root was located 0.1016 m from the centre of rotation. The tip of the blade was a NACA0012 profile with a 0.0762 m chord length. The tip was 0.8128 m from the centre of rotation. The blade was twisted to maintain a pitch of 0.1524 m/revolution along its path. The two profiles were blended/lofted from root to tip linearly. The generator used in testing was a 3 phase AC generator with a radial air-core configuration. Its outer dimensions were approximately 80 mm×120 mm. It had 4 electrical poles per phase and each pole was wound with 30 turns of 18AWG wire. The interior rotor contained 4 Neodymium Grade N52 block magnets that are 5 cm×2.5 cm×1.3 cm. The generator's rotor shaft was coupled with a 1:27 gearbox. The output of the gearbox was coupled with the interior follower of a magnetic coupling. This allowed power transmission from the turbine (in the ocean) to the gearbox/generator inside the pressure housing. However, other readily available electronics, turbines, generators and connectors may be used within the scope of this disclosure Options for the flexible shaft are available. The first option, as shown in FIG. 1, is a hollow flexible carbon fibre tube with electrical wires running inside. The second is a stainless steel anti-twist wire rope with internal electrical cabling (wireline cable). Alternatively, the cabling could be wrapped around the flexible support shaft. The diameter of the wireline cable or flexible carbon fibre shaft would be selected according to the flow in the installation area. Low flow rates would require a smaller diameter shaft/wire so that the lower flow rates would 'pull' the turbine into position and higher flow rates would not put as much strain/stress on a small shaft/wire. The wire/shaft also can't be too 'thin' so that the induced torque of the generator twists the shaft/wire. A ~1 cm diameter shaft/cable in flow rates up to 0.6 m/s operates, but other tolerances are within the scope of the invention.

The combination of elements attached to the anchored base (but not the base itself, of course) may be slightly positively buoyant, as may the distal components themselves, so that the buoyancy force keeps the flexible support shaft upright or nearly upright in zero flow, yet only marginally so. The device is not so buoyant, such that, even in low flow, the drag on the turbines (and optional fins) easily pulls the turbine down into the flow. Alternatively or in addition, resilience of the shaft may bias the turbine blades away from the sea bed towards the vertical and either aid (overcome) the buoyancy (lack of buoyancy) at the head of the shaft to return the turbine to a vertical non-operating condition in the absence of flow or while being lowered for installation or raised for maintenance/removal.

The foregoing embodiments and advantages are merely exemplary and are not to be construed as limiting the present invention. The present teaching can be readily applied to other types of apparatuses. Also, the description of the embodiments of the present invention is intended to be illustrative, and not to limit the scope of the claims, and many alternatives, modifications, and variations will be apparent to those skilled in the art.

The invention claimed is:

1. An underwater power generation unit, comprising:
a turbine unit comprising a turbine for powering a generator in the turbine unit, the turbine unit connected by a resiliently flexible member to a base, the resiliently flexible member biased to a normal configuration of the resiliently flexible member,
wherein the power generation unit is shaped to permit a force applied by water current in a direction of flow to orient an axis of the turbine substantially in the direction of flow without moving the base.

2. The power generation unit of claim 1 wherein the turbine unit further comprises stabilizing fins on at least one of the generator and turbine.

3. The power generation unit of claim 2 wherein the stabilizing fins are tethered tail fins connected to the turbine unit downstream from the resiliently flexible member.

4. The power generation unit of claim 2 wherein the stabilizing fins are a cowling about the turbine.

5. The power generation unit of claim 1 further comprising electrical cabling for transmitting electrical power generated by the generator to an electrical interconnection in the base.

6. The power generation unit of claim 1 further comprising electrical cabling for transmitting electrical power generated by the generator to an electrical interconnection not in the base.

7. The power generation unit of claim 1 further comprising electrical cabling within the resiliently flexible member for transmitting electrical power generated by the generator to electronics at the base.

8. The power generation unit of claim 7 wherein the resilient flexible member is connected to the base in a vertical position.

9. The power generation unit of claim 7 wherein the turbine unit is marginally buoyant.

10. The power generation unit of claim 9 wherein the base can be anchored to a bed of a body of water with a water current of less than 0.5 m/s, and the water current will simultaneously orient the turbine substantially in the direction of flow of such current and turn the turbines generating electrical power.

11. A method of generating electricity for use in subsurface electronics, comprising:
a. Identifying a region having seafloor current of variable direction;
b. Anchoring a power generator unit to the seafloor in such region, the power generation unit comprising
a turbine unit comprising a turbine for powering a generator in the turbine unit and a cowling shaped to permit a force applied by water current in a direction of flow to orient an axis of the turbine substantially in the direction of flow, the turbine unit connected by a resiliently flexible hollow member to a base, the base anchored to the seafloor, and the resiliently flexible member biased to a normal configuration of the resiliently flexible member; and
a power cable extending from the generator through the resiliently flexible hollow member to the base; and
c. connecting electronics to the power cable to obtain electricity whenever the seafloor current of variable direction is greater than approximately 0.5 m/s and simultaneously orients the turbine substantially in the direction of flow of the seafloor current and turns the turbines.

* * * * *